(12) United States Patent
Lee et al.

(10) Patent No.: US 8,289,923 B2
(45) Date of Patent: Oct. 16, 2012

(54) APPARATUS AND METHOD FOR REDUCTION OF HANDOVER INTERRUPTION TIME USING ESTIMATED HANDOVER TIME NEGOTIATION IN A BROADBAND WIRELESS COMMUNICATION SYSTEM

(75) Inventors: Ok-Seon Lee, Suwon-si (KR); Jong-Hyung Kwun, Seongnam-si (KR); Jae-Hyun Kim, Seoul (KR); Hyun-Jin Lee, Pohang-si (KR)

(73) Assignees: Samsung Electronics Co., Ltd., Suwon-Si (KR); Ajou University Industry-Academic Cooperation Foundation, Suwon-Si (KR)

( * ) Notice: Subject to any disclaimer, the term of this patent is extended or adjusted under 35 U.S.C. 154(b) by 459 days.

(21) Appl. No.: 12/384,917

(22) Filed: Apr. 10, 2009

(65) Prior Publication Data
US 2009/0258650 A1    Oct. 15, 2009

(30) Foreign Application Priority Data
Apr. 11, 2008    (KR) .................. 10-2008-0033642

(51) Int. Cl.
*H04W 4/00* (2009.01)

(52) U.S. Cl. ........ 370/331; 370/310; 370/328; 370/329; 455/436; 455/437; 455/438; 455/442

(58) Field of Classification Search .................. 455/436, 455/437, 438, 439, 440, 442, 441, 443; 370/331, 370/310, 328, 329
See application file for complete search history.

(56) References Cited

U.S. PATENT DOCUMENTS

| | | | | |
|---|---|---|---|---|
| 2005/0192011 A1* | 9/2005 | Hong et al. | ................... | 455/440 |
| 2006/0073828 A1* | 4/2006 | Sipila | ............................. | 455/436 |
| 2007/0291699 A1* | 12/2007 | Lee et al. | ..................... | 370/332 |
| 2011/0007689 A1* | 1/2011 | Shen et al. | ..................... | 370/328 |

FOREIGN PATENT DOCUMENTS

| KR | 1020070046404 A | 5/2007 |
|---|---|---|
| WO | WO 2006/014062 A2 | 2/2006 |

OTHER PUBLICATIONS

International Search Report dated Jul. 27, 2009 in connection with PCT Application No. PCT/KR2009/001868.

* cited by examiner

*Primary Examiner* — Kathy Wang-Hurst (57) ABSTRACT

An apparatus and method for reduction of a handover interruption time using an estimated handover time negotiation in a broadband wireless communication system are provided. A method for supporting a handover of a mobile station in a serving base station includes receiving a handover pre-notification response message including a residual estimated handover time from a target base station, determining a current residual estimated handover time using the residual estimated handover time, and exchanging the determined residual estimated handover time with the target base station.

22 Claims, 5 Drawing Sheets

APPARATUS AND METHOD FOR REDUCTION OF HANDOVER INTERRUPTION TIME USING ESTIMATED HANDOVER TIME NEGOTIATION IN A BROADBAND WIRELESS COMMUNICATION SYSTEM

CROSS-REFERENCE TO RELATED APPLICATION(S) AND CLAIM OF PRIORITY

The present application claims priority under 35 U.S.C. §119(a) to a Korean Patent Application entitled "APPARATUS AND METHOD FOR REDUCTION OF HANDOVER INTERRUPTION TIME USING ESTIMATED HANDOVER TIME NEGOTIATION IN BROADBAND WIRELESS COMMUNICATION SYSTEMS" filed in the Korean Intellectual Property Office on "Apr. 11, 2008" and assigned Serial No. "10-2008-0033642", the contents of which are herein incorporated by reference.

TECHNICAL FIELD OF THE INVENTION

The present invention relates to Handover (HO). More particularly, the present invention relates to an apparatus and method for reduction of a HO interruption time using an estimated HO time negotiation in a broadband wireless communication system.

BACKGROUND OF THE INVENTION

A Handover (HO) process proposed in Institute of Electrical and Electronics Engineers (IEEE) 802.16e mobile Worldwide Interoperability for Microwave Access (WiMAX) includes a scanning process for measuring signals of a serving Base Station (BS) and a neighbor BS, a pre-HO process for determining a target BS of a Mobile Station (MS) to perform HO, and a HO execution process for releasing a connection with the serving BS and resetting a connection with the target BS. By periods or if a signal quality of the serving BS is reduced to a predetermined level or less, the MS sends a scanning request message to the serving BS and acquires signal quality information of neighbor BSs through the scanning process. Also, the MS can perform an association process to acquire a physical layer parameter of the neighbor BS and network information during the scanning process.

A conventional HO scheme is described in detail. If a signal quality of a serving BS is reduced to a predetermined level or less, an MS transmits a HO request (MOB_MSHO-REQ) message including signal quality information of neighbor BSs, to the serving BS. Then, the serving BS receives the HO request (MOB_MSHO-REQ) message transmitted by the MS. Alternately, the serving BS compares signal quality information of the neighbor BSs specified in a scanning report (MOB_SCN-REP) message transmitted by the MS with a HO initialization condition and, if signal qualities of the neighbor BSs meet the HO initialization condition, the serving BS transmits HO pre-notification (HO-pre-notification) messages to the neighbor BSs in order to recognize HO acknowledgment or non-acknowledgement for the MS to perform HO. The HO pre-notification (HO-pre-notification) message includes information on a wireless resource (i.e., bandwidth) and service class (i.e., Quality of Service (QoS) level) required by the MS as well as an estimated HO time of the MS.

Then, the neighbor BSs transmit HO pre-notification response (HO-pre-notification-response) messages including information on HO acknowledgement or non-acknowledgement and a serviceable wireless resource and service class, to the serving BS. Then, the serving BS transmits a HO response (MOB_BSHO-RSP) message to the MS and transmits a HO pre-notification confirm (HO-pre-notification-confirm) message to the neighbor BS that sends an acknowledgement response for a HO of the MS. The HO response (MOB_B-SHO-RSP) message includes information on neighbor BSs sending acknowledgement responses for HO of an MS, and information on a wireless resource and service class serviceable by each of the neighbor BSs, an estimated HO action time, and a resource retain time for retaining a wireless resource allocated by a serving BS to the MS.

Then, the MS transmits a HO indication (MOB_HO-IND) message of informing performance of final HO to a target BS, to the serving BS. After the resource retain time, the MS releases a connection setup with the serving BS. Then, the MS receives a signal for downlink channel synchronization and a DownLink/UpLink MAP (DL/UL-MAP) from the target BS to reset a connection with the target BS, performs a ranging process with the target BS to be allocated a Connection IDentifier (CID) and, during a corresponding period, sets a magnitude of a UL transmit signal, thus resetting a connection with the target BS.

In order to reduce a HO delay caused by ranging of a HO MS, the target BS can transmit a fast ranging Information Element (IE) to the MS at the estimated HO time. However, the estimated HO time is forwarded from the serving BS only to the neighbor BS. Thus, it may occur that the MS cannot consider the conditions of the target BS that is a target for HO and in addition, the MS fails to receive the fast ranging IE transmitted by the target BS if a pre-HO delay that is a time for which the MS prepares HO increases because of an increase of a delay caused by a loss of the HO response (MOB_BSHO-RSP) message resulting from attenuation of a signal strength of the HO MS, a backbone network delay between the serving BS and the target BS, and a queuing delay caused by a traffic increase of the serving BS. This may result in an increase of a time for which the MS cannot be served during HO performance, that is, a HO interruption time for which normal communication performance after a release of a connection with the serving BS is impossible, thus causing the deterioration of a QoS for the MS.

As a solution to this, the estimated HO time increases. In such event, a delay necessary for receiving the fast ranging IE also increases. Therefore, in like manner, a problem exists in that the HO interruption time may not only increase but also a physical layer parameter of the target BS acquired in an association process may be changed, thus causing a failure of fast ranging. Additionally, a problem exists in that, if the serving BS fails to successfully transmit traffic transmitted to the MS before a release of a connection setup while performing HO for the MS after transmitting the HO pre-notification messages to the neighbor BSs, a packet loss may occur, or a decrease of a QoS may occur because of a delay caused by tunneling from the serving BS to the target BS.

SUMMARY OF THE INVENTION

To address the above-discussed deficiencies of the prior art, it is a primary aspect of the present invention is to substantially solve at least the above problems and/or disadvantages and to provide at least the advantages below. Accordingly, one aspect of the present invention is to provide an apparatus and method for, upon performance of HO, reducing a HO interruption time for which an MS cannot be served while performing HO, using an estimated HO time negotiation between a serving BS and a target BS in a broadband wireless communication system.

Another aspect of the present invention is to provide a HO apparatus and method for providing a seamless service to a user through the exchange of an estimated HO time between BSs in a broadband wireless communication system.

A further aspect of the present invention is to provide an apparatus and method for, by allowing a serving BS and a target BS to negotiate an estimated HO time of an MS while the MS performs HO, allowing the MS to stably receive a fast ranging IE and reducing a HO interruption time in a broadband wireless communication system.

The above aspects are achieved by providing an apparatus and method for reduction of a HO interruption time using an estimated HO time negotiation in a broadband wireless communication system.

According to one aspect of the present invention, a method for supporting a HO of an MS in a serving BS is provided. The method includes receiving a HO pre-notification response message including a residual estimated HO time from a target BS, determining a current residual estimated HO time using the residual estimated HO time, and exchanging the determined residual estimated HO time with the target BS.

According to another aspect of the present invention, a method for supporting a HO of an MS in a target BS is provided. The method includes receiving a HO pre-notification message including an estimated HO time from a serving BS of the MS, determining a residual estimated HO time using the estimated HO time, and transmitting a HO pre-notification response message including the determined residual estimated HO time to the serving BS.

According to a further aspect of the present invention, an apparatus for supporting a HO of an MS in a serving BS is provided. The apparatus includes a receiver, a HO processor, and a transmitter. The receiver receives a HO pre-notification response message including a residual estimated HO time from a target BS. The HO processor determines a current residual estimated HO time using the residual estimated HO time. The transmitter exchanges the determined current residual estimated HO time with the target BS.

According to yet another aspect of the present invention, an apparatus for supporting a HO of an MS in a target BS is provided. The apparatus includes a receiver, a HO processor, and a transmitter. The receiver receives a HO pre-notification message including an estimated HO time from a serving BS of the MS. The HO processor determines a residual estimated HO time using the estimated HO time. The transmitter transmits a HO pre-notification response message including the determined residual estimated HO time to the serving BS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

An apparatus and method for reduction of a HO interruption time using an estimated HO time negotiation in a broadband wireless communication system according to an exemplary embodiment of the present invention are described below.

The present invention relates to a scheme for updating, by a serving BS and a target BS, an estimated HO time of an MS in a HO message exchange process between BSs taking into consideration transmission delay of a backbone network, transmission delay of a wireless network, and transmission delay caused by a wireless network packet loss, and transmitting, by the target BS, a fast ranging IE to the MS at a finally updated estimated HO time of the MS. Such a method can be a solution to a problem that, because a pre-HO delay exceeds an estimated HO time, the MS fails to receive the fast ranging IE transmitted by the target BS. Additionally, the MS indirectly takes part in determining an estimated HO time, thus being able to optimize a time of transmission of the fast ranging IE. This reduces a HO interruption time that is a time taken for the MS to set a connection with the target BS, thus improving a QoS of the MS.

Figure 1:
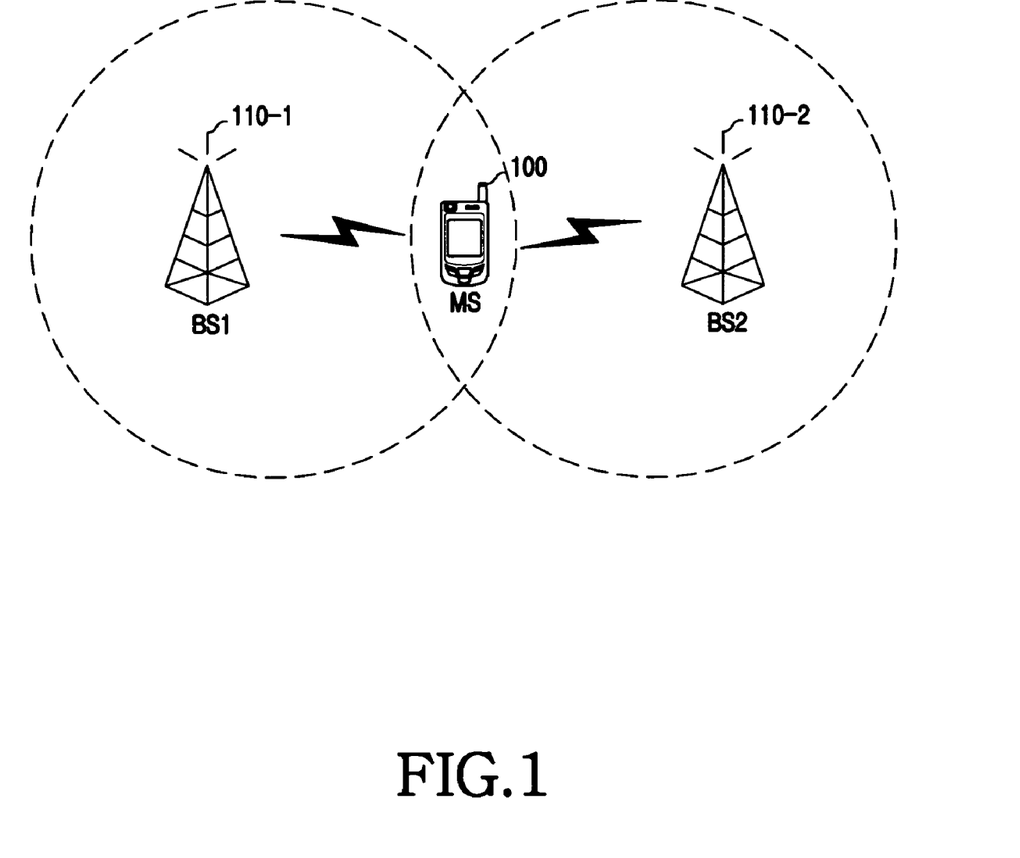
FIG. 1 is a diagram illustrating conditions in which a Handover of an MS is accomplished in a broadband wireless communication system according to an exemplary embodiment of the present invention.

FIG. 1 is a diagram illustrating conditions in which a HO of an MS is accomplished in a broadband wireless communication system according to an exemplary embodiment of the present invention.

Referring to FIG. 1, while an MS 100 is in service from a BS1 110-1 in an area of the BS1 110-1, if the MS 100 is positioned in a cell boundary and recognizes a deterioration of signal quality from the BS1 110-1, the MS 100 attempts HO to a BS2 110-2 having an excellent signal quality among neighbor BSs.

Figure 2:
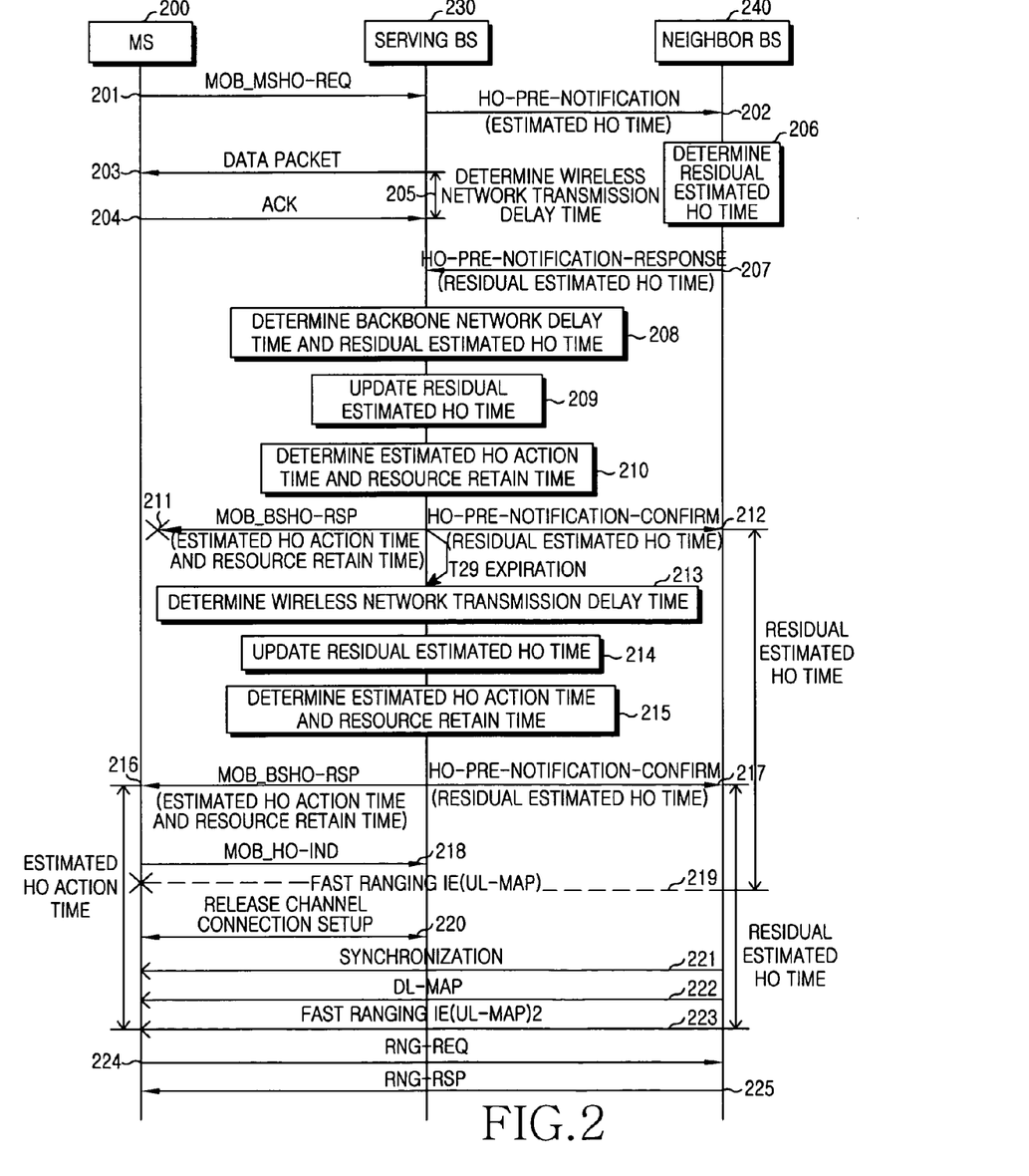
FIG. 2 is a ladder diagram illustrating a HO process of an MS in a broadband wireless communication system according to an exemplary embodiment of the present invention.

FIG. 2 is a ladder diagram illustrating a HO process of an MS in a broadband wireless communication system according to an exemplary embodiment of the present invention.

Referring to FIG. 2, if a signal quality of a serving BS 230 is reduced to a predetermined level or less, an MS 200 acquires signal quality information of neighbor BSs 240 through a scanning process. In step 201, the MS 200 transmits a HO request (MOB_MSHO-REQ) message including the acquired signal quality information of the neighbor BSs 240, to the serving BS 230.

In step 202, the serving BS 230 determines if the MS 200 meets an HO initialization condition using the signal quality information of the neighbor BSs 240 specified in the HO request message. If the MS 200 meets the HO initialization condition, the serving BS 230 transmits HO pre-notification messages to the neighbor BSs 240 to recognize acknowledgement or non-acknowledgement of a HO of the MS 200. In addition to when the HO request message is received from the MS 200 as above, when the MS 200 is determined to meet the HO initialization condition, the serving BS 230 can transmit the HO pre-notification messages to the neighbor BSs 240. The HO pre-notification message includes information of the MS 200 to perform HO, and information on a wireless resource (i.e., a bandwidth) and service class (i.e., QoS level) required by the MS 200, an estimated HO time, and a time at which the HO pre-notification message is generated (i.e., a time stamp).

Then, the serving BS 230 determines a wireless network transmission delay time ($T_{RTT}$) using a DL data packet transmitted to the MS 200 while waiting for HO pre-notification response messages from the neighbor BSs 240. That is, in step 203, the serving BS 230 transmits the DL data packet to the MS 200. In step 204, the serving BS 230 receives an Acknowledgement (ACK) response to the DL data packet from the MS 200. In step 205, the serving BS 230 determines the wireless network transmission delay time ($T_{RTT}$) using a time for transmitting the DL data packet and a time for receiving the ACK response as given in Equation 1:

$$T_{RTT} \leftarrow \alpha T_{RTT} + (1-\alpha)(T_{ACK} - T_{Data}) \quad \text{[Eqn. 1]}$$

In Equation 1, the '$T_{Data}$' represents a time for transmitting the DL data packet, and the '$T_{ACK}$' represents a time for receiving the ACK response to the DL data packet. Also, the '$\alpha$' represents a weight within a range of $0 \leq \alpha \leq 1$. That is, the wireless network transmission delay time ($T_{RTT}$) is determined by applying a suitable weight to a previous $T_{RTT}$ and current wireless network transmission delay conditions.

In step 206, the neighbor BS 240 receiving the HO pre-notification message from the serving BS 230 determines if acknowledgement of a HO of the MS 200 is possible, determines a serviceable wireless resource and service class depending on the determination result, and determines a residual estimated HO time ($T_{Residual, N}$). That is, the neighbor BS 240 determines if the acknowledgement of the HO of the MS 200 is possible on the basis of the wireless resource and service class required by the MS 200. If the acknowledgement of the HO of the MS 200 is not determined to be possible, the neighbor BS 240 determines a serviceable wireless resource and a serviceable service class. If the acknowledgement of the HO of the MS 200 is determined to be possible, the neighbor BS 240 defines a serviceable wireless resource and service class as the wireless resource and service class required by the MS 200.

The residual estimated HO time ($T_{Residual, N}$) can be determined using the information included in the HO pre-notification message as given in Equation 2:

$$T_{Residual,N} = T_{ET} - (T_{LT} - T_{TS}) \quad \text{[Eqn. 2]}$$

In Equation 2, the '$T_{ET}$' represents the estimated HO time specified in the HO pre-notification message, the '$T_{LT}$' represents a time for receiving the HO pre-notification message, and '$T_{TS}$' represents a time at which the HO pre-notification message is generated (i.e., a time stamp).

Then, in step 207, the neighbor BS 240 transmits a HO pre-notification response (HO-pre-notification-response) message including information on the determined serviceable wireless resource and service class and residual estimated HO time ($T_{Residual, N}$) to the serving BS 230. In addition to the aforementioned information, the HO pre-notification response message further includes information on the HO acknowledgement or non-acknowledgement for the MS 200 and a time at which the HO pre-notification response message is generated (i.e., a time stamp).

The serving BS 230 selects one of the neighbor BSs 240 as a target BS using the serviceable wireless resource and service class included in the HO pre-notification response message from each of the neighbor BSs 240. In step 208, the serving BS 230 determines a backbone network delay time ($T_{BD}$) and a residual estimated HO time ($T_{Residual, S}$) for HO to the target BS using the residual estimated HO time ($T_{Residual, N}$) of the selected target BS.

The backbone network delay time ($T_{BD}$) can be determined as in Equation 3:

$$T_{BD} = T_{ET} - T_{Residual,N} \quad \text{[Eqn. 3]}$$

That is, the backbone network delay time ($T_{BD}$) is determined using a difference between the estimated HO time ($T_{ET}$) specified in the HO pre-notification message transmitted by the serving BS 230 to the neighbor BS 240 and the residual estimated HO time ($T_{Residual, N}$) specified in the HO pre-notification response message transmitted by the selected target BS to the serving BS 230.

The residual estimated HO time ($T_{Residual, S}$) for HO to the target BS can be determined using the information included in the HO pre-notification response message as given in Equation 4:

$$T_{Residual,S} = T_{Residual,N} - (T'_{LT} - T'_{TS}) \quad \text{[Eqn. 4]}$$

In Equation 4, the '$T'_{LT}$' represents a time for receiving the HO pre-notification response message, and the '$T'_{TS}$' represents a time at which the HO pre-notification response message is generated (i.e., a time stamp).

Then, in step 209, the serving BS 230 updates the residual estimated HO time ($T_{Residual, S}$) taking into consideration the determined backbone network delay time and wireless network transmission delay time as given in Equation 5:

$$T_{Residual,S} = \text{Max}\{T_{RTT} + T_{Sync} + T_{Margin}, T_{BD}, T_{Residential,S}\} \quad \text{[Eqn. 5]}$$

In Equation 5, the wireless network transmission delay time ($T_{RTT}$) represents a time until the serving BS 230 receives a HO indication (MOB_HO-IND) message from the MS 200 after transmitting a HO response (MOB_BSHO-RSP) message to the MS 200. The '$T_{Sync}$' is a time for synchronization between the MS 200 and the target BS 240 and represents a time for which the MS 200 accomplishes synchronization with the target BS 240 after transmitting the HO indication (MOB_HO-IND) message to the serving BS 230.

The '$T_{Margin}$' represents a time for acquiring, by the MS 200, a fast ranging IE from the target BS 240 after synchronization. That is, the '$T_{RTT}+T_{Sync}+T_{Margin}$' is a HO preparation time of the MS 200 (i.e., a time until the MS 200 performs HO and acquires DownLink (DL) channel information (i.e., a fast ranging IE) of the target BS 240) and, for example, represents a time from subsequent step 216 to step 223. Also, the backbone network delay time ($T_{BD}$) is a HO preparation time of the target BS 240 (i.e., a transmission delay time of a HO pre-notification confirm (HO-pre-notification-confirm) message) and, for example, represents a time of subsequent step 217. As above, the residual estimated HO time ($T_{Residual, S}$) is updated by the largest value among the HO preparation time of the MS 200, the HO preparation time of the target BS 240, and the residual estimated HO time determined by the serving BS 230.

Then, in step 210, the serving BS 230 determines an estimated HO action time and resource retain time of a frame unit using the updated residual estimated HO time ($T_{Residual, S}$) as given in Equation 6:

$$\text{Action\_time} = \left\lceil \frac{T_{Residual,S}}{T_{frame}} \right\rceil \qquad [\text{Eqn. 6}]$$

$$\text{Resource\_retain\_time} = \left\lceil \frac{T_{Residual,S} - T_{sync} - T_{Margin}}{T_{frame}} \right\rceil$$

Then, in step 211, the serving BS 230 transmits a HO response (MOB_BSHO-RSP) message including information on the determined estimated HO action time and resource retain time to the MS 200. In step 212, the serving BS 230 transmits a HO pre-notification confirm (HO-pre-notification-confirm) message including information on the updated residual estimated HO time ($T_{Residual, S}$) to the target BS 240. In addition to the aforementioned information, the HO response message further includes information of the target BS 240 and information on a wireless resource and QoS serviceable by the target BS 240. In addition to the aforementioned information, the HO pre-notification confirm message further includes information of the MS 200, and information on a time at which the HO pre-notification confirm message is generated (i.e. a time stamp) and the wireless resource and QoS serviceable by the target BS 240. At this time, the serving BS 230 operates a T29 timer that is set on the basis of the determined $T_{RTT}$, and determines if the HO indication message is received from the MS 200 until the T29 timer expires. Here, the target BS 240 receiving the HO pre-notification confirm message can transmit a fast ranging IE to the MS 200 after the residual estimated HO time ($T_{Residual, S}$), using the residual estimated HO time ($T_{Residual, S}$) included in the HO pre-notification confirm message.

If the HO response message is not successfully transmitted to the MS 200 in step 211, the serving BS 230 will fail to receive the HO indication message from the MS 200 until the T29 timer expires and thus, the MS 200 cannot receive, in orderly fashion, a fast ranging IE that the target BS 240 transmits after the residual estimated HO time ($T_{Residual,S}$) as in step 219.

In this case, the serving BS 230 updates and retransmits a parameter necessary for the HO response message and HO pre-notification confirm message. That is, in step 213, the serving BS 230 again determines the wireless network transmission delay time ($T_{RTT}$). In step 214, the serving BS 230 updates the residual estimated HO time ($T_{Residual, S}$) considering the again determined wireless network transmission delay time and the backbone network delay time previously determined in step 208. In step 215, the serving BS 230 determines an estimated HO action time and resource retain time using the updated residual estimated HO time ($T_{Residual, S}$). Then, in steps 216 and 217, the serving BS 230 transmits a HO response message and a HO pre-notification confirm message in the same methods as those of steps 211 and 212. Also, the serving BS 230 operates the T29 timer in the same method, and determines if the HO indication message is received from the MS 200 until the T29 timer expires.

If the HO response message is successfully transmitted to the MS 200 in step 216, in step 218, before the T29 timer expires, the MS 200 transmits, to the serving BS 230, the HO indication message of informing whether final HO to the target BS 240 is performed. In step 220, the MS 200 releases a channel connection setup with the serving BS 230 after the resource retain time.

In steps 221 and 222, the target BS 240 receiving the HO pre-notification confirm message in step 217 transmits a signal for DL channel synchronization and a DL MAP (DL-MAP) to set a connection with the MS 200. In step 223, the target BS 240 transmits a fast ranging IE (i.e., a UL-MAP) to the MS 200 after the residual estimated HO time ($T_{Residual, S}$), using the residual estimated HO time ($T_{Residual, S}$) included in the HO pre-notification confirm message. Then, the MS 200 performs a ranging process with the target BS 240 to be allocated a CID and, during this period, sets a magnitude of a UL transmit signal, thus resetting a connection with the target BS 240. That is, in step 224, the MS 200 transmits a ranging request (RNG-REQ) message to the target BS 240 and, in step 225, receives a ranging response (RNG-RSP) message from the target BS 240, thus performing the ranging process.

Figure 3:
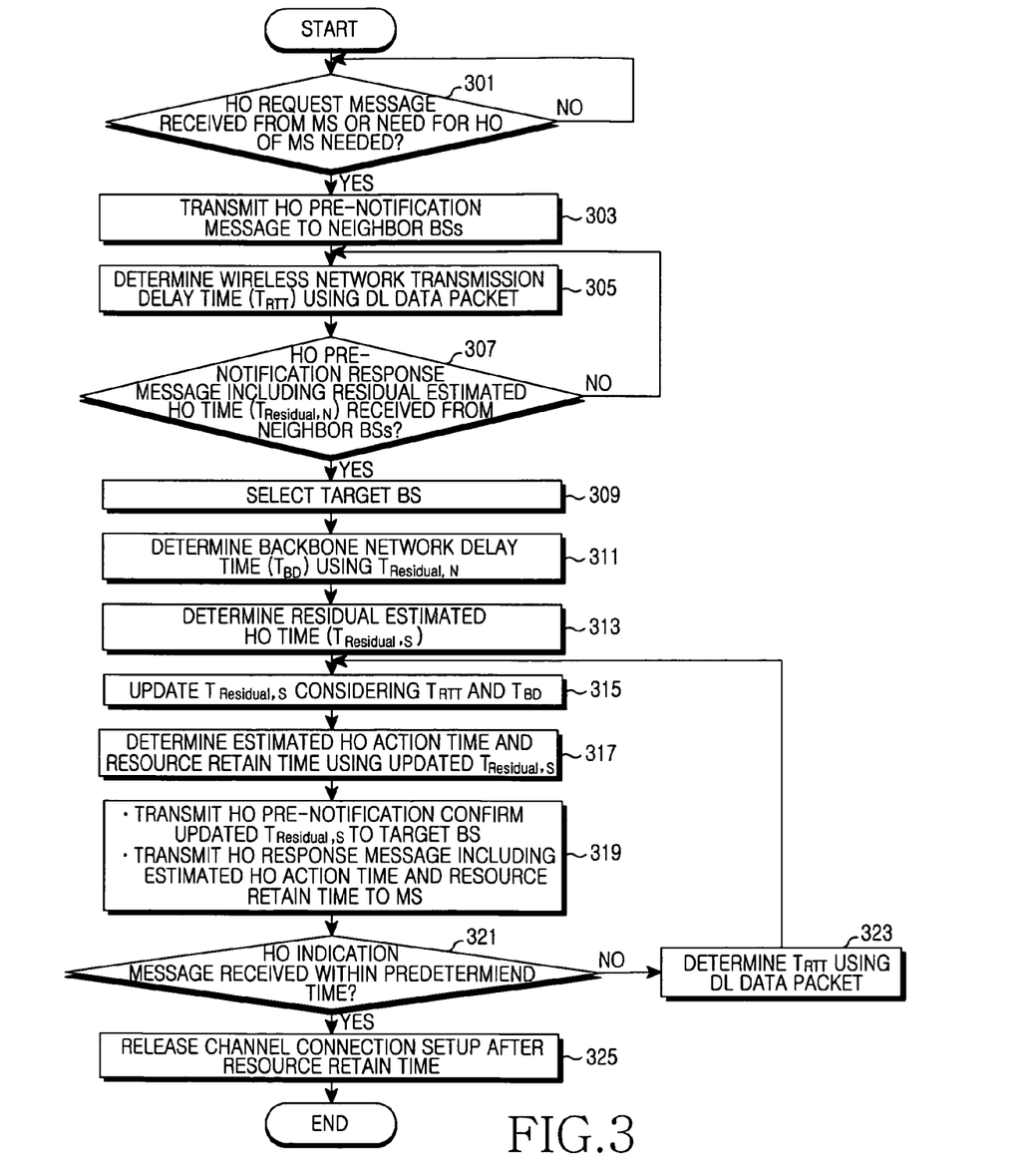
FIG. 3 is a flow diagram illustrating an operation of a serving BS for HO of an MS in a broadband wireless communication system according to an exemplary embodiment of the present invention.

FIG. 3 is a flow diagram illustrating an operation of a serving BS for HO of an MS in a broadband wireless communication system according to an exemplary embodiment of the present invention.

Referring to FIG. 3, in step 301, the serving BS determines if a HO request message is received from an MS or a HO of the MS is needed. If the HO request message is received from the MS or the HO of the MS is needed, in step 303, the serving BS transmits HO pre-notification messages to neighbor BSs to recognize acknowledgement or non-acknowledgement of the HO of the MS. The HO pre-notification message includes information of the MS to perform HO, and information on a wireless resource and service class required by the MS, an estimated HO time, and a time at which the HO pre-notification message is generated.

Then, in step 305, the serving BS determines a wireless network transmission delay time ($T_{RTT}$) using a DL data packet. That is, the serving BS transmits the DL data packet to the MS, receives an ACK response to the DL data packet from the MS, and determines the wireless network transmission delay time using a time for transmitting the DL data packet and a time for receiving the ACK response as given in Equation 1 above.

Then, in step 307, the serving BS determines if HO pre-notification response messages including information on a residual estimated HO time ($T_{Residual, N}$) are received from the neighbor BSs. The HO pre-notification response message includes information on a wireless resource and serving class serviceable by a corresponding neighbor BS for an MS, a residual estimated HO time ($T_{Residual, N}$), HO acknowledgement or non-acknowledgement for the MS, and a time at which the HO pre-notification response message is generated. If the HO pre-notification response message is not received, the serving BS returns to step 305 and repeatedly perform subsequent steps.

If the HO pre-notification response message is received, in step 309, the serving BS selects one of the neighbor BSs as a target BS using the serviceable wireless resource and service class included in the HO pre-notification response message from each of the neighbor BSs.

Then, in step 311, the serving BS determines a backbone network delay time ($T_{BD}$) using the residual estimated HO time ($T_{Residual, N}$) of the selected target BS as given in Equation 3 above. In step 313, the serving BS determines a residual estimated HO time ($T_{Residual, S}$) for HO to the target BS using the information included in the HO pre-notification response message as given in Equation 4 above.

Then, in step 315, the serving BS updates the residual estimated HO time ($T_{Residual, S}$) taking into consideration the determined wireless network transmission delay time ($T_{RTT}$) and backbone delay time ($T_{BD}$) as given in Equation 5 above. That is, the serving BS updates the residual estimated HO time ($T_{Residual, S}$) by the largest value among a HO preparation time of the MS, a HO preparation time of the target BS, and the residual estimated HO time determined by the serving BS.

Then, in step 317, the serving BS determines an estimated HO action time and a resource retain time using the updated residual estimated HO time ($T_{Residual, S}$) as given in Equation 6 above.

Then, in step 319, the serving BS transmits a HO pre-notification confirm message including information on the updated residual estimated HO time ($T_{Residual, S}$) to the target BS, and transmits a HO response message including information on the determined estimated HO action time and resource retain time to the MS. In addition to the aforementioned information, the HO response message further includes information of the target BS and information on a wireless resource and QoS serviceable by the target BS. Also in addition to the aforementioned information, the HO pre-notification confirm message further includes the information of the MS, and information on a time at which the HO pre-notification confirm message is generated and the wireless resource and QoS serviceable by the target BS.

Then, in step 321, the serving BS determines if a HO indication message is received from the MS within a predetermined time. The predetermined time represents an operation time of a T29 timer that is set on the basis of the determined $T_{RTT}$. If the HO indication message is not received within the predetermined time, in step 323, the serving BS again determines a wireless network transmission delay time ($T_{RTT}$) using a DL data packet, and returns to step 315 and repeatedly performs subsequent steps. If the HO indication message is received within the predetermined time, in step 325, the serving BS releases a channel connection setup with the MS after the resource retain time.

Then, the serving BS terminates the process according to an exemplary embodiment of the present invention.

Figure 4:
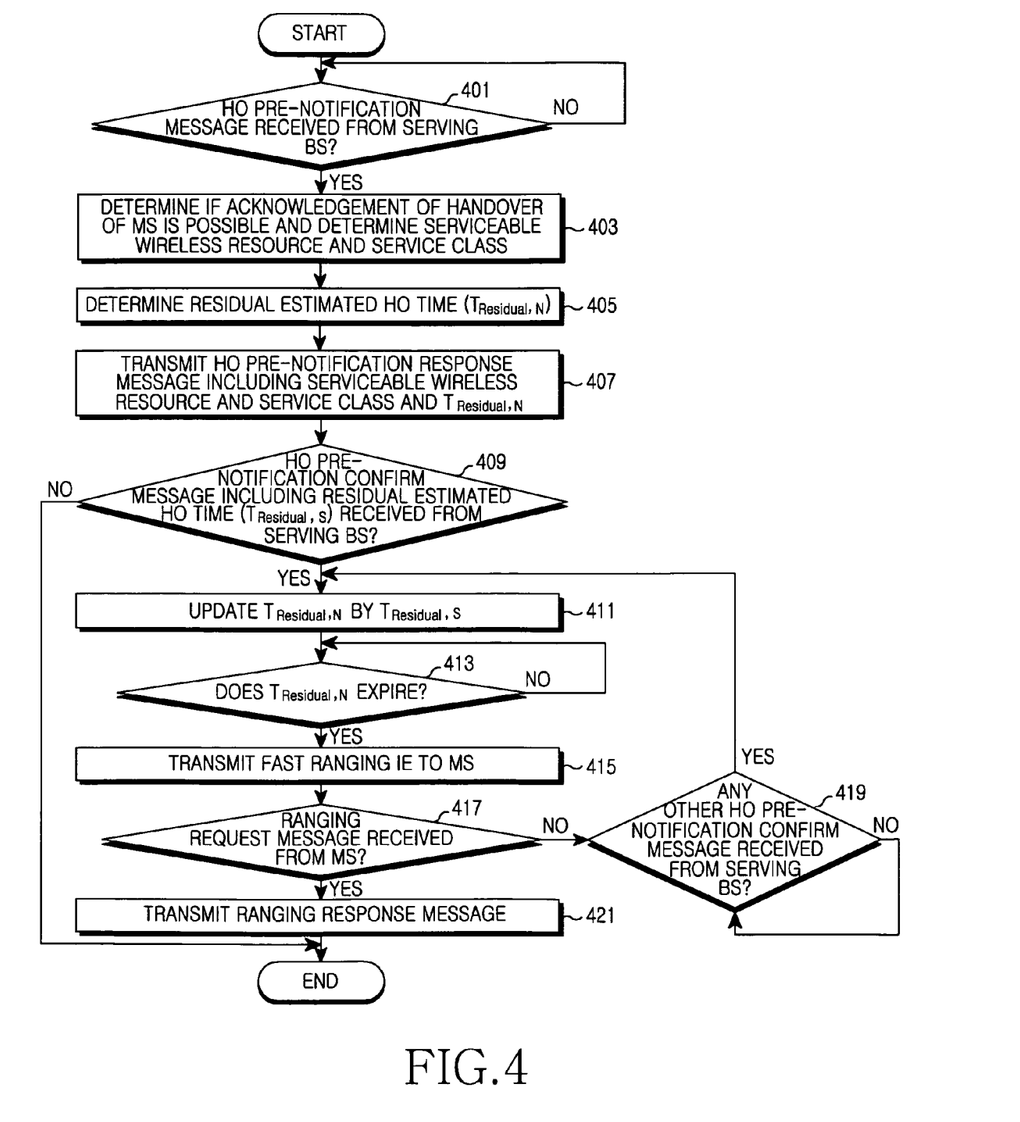
FIG. 4 is a flow diagram illustrating an operation of a neighbor BS for HO of an MS in a broadband wireless communication system according to an exemplary embodiment of the present invention.

FIG. 4 is a flow diagram illustrating an operation of a neighbor BS for HO of an MS in a broadband wireless communication system according to an exemplary embodiment of the present invention.

Referring to FIG. 4, in step 401, the neighbor BS determines if a HO pre-notification message is received from a serving BS of an MS. The HO pre-notification message includes information of the MS to perform HO, and information on a wireless resource and service class required by the MS, an estimated HO time, and a time at which the HO pre-notification message is generated.

If the HO pre-notification message is received, in step 403, the neighbor BS determines if acknowledgment of a HO of the MS is possible and then, determines a serviceable wireless resource and service class depending on the determination result. That is, the neighbor BS determines if the acknowledgement of the HO of the MS is possible on the basis of the wireless resource and service class required by the MS. If the acknowledgement of the HO of the MS is determined to be impossible, the neighbor BS determines a serviceable wireless resource and a serviceable service class. If the acknowledgement of the HO of the MS is determined to be possible, the neighbor BS defines a serviceable wireless resource and service class as the wireless resource and service class required by the MS.

Then, in step 405, the neighbor BS determines a residual estimated HO time ($T_{Residual, N}$) using the information included in the HO pre-notification message as in given in Equation 2 above. In step 407, the neighbor BS transmits a HO pre-notification response message including information on the determined serviceable wireless resource and service class and residual estimated HO time ($T_{Residual, N}$) to the serving BS. In addition to the aforementioned information, the HO pre-notification response message further includes information on acknowledgement or non-acknowledgement of the HO of the MS and a time at which the HO pre-notification response message is generated.

Then, in step 409, the neighbor BS determines if a HO pre-notification confirm message including information on a residual estimated HO time ($T_{Residual, S}$) is received from the serving BS. In addition to the aforementioned information, the HO pre-notification confirm message further includes information of the MS, and information on a time at which the HO pre-notification confirm message is generated and a wireless resource and QoS serviceable by the target BS. If the HO pre-notification confirm message is not received, the neighbor BS terminates the process according to an exemplary embodiment of the present invention. If the HO pre-notification confirm message is received, in step 411, the neighbor BS updates the determined residual estimated HO time ($T_{Residual, N}$) by the received residual estimated HO time ($T_{Residual, S}$) and operates a timer with the updated residual estimated HO time ($T_{Residual, N}$).

Then, in step 413, the neighbor BS determines if the timer for the residual estimated HO time ($T_{Residual, N}$) expires. If the timer for the residual estimated HO time ($T_{Residual, N}$) expires, in step 415, the neighbor BS transmits a fast ranging IE to the MS.

Then, in step 417, the neighbor BS determines if a ranging request message is received from the MS. If the ranging request message is not received, in step 419, the neighbor BS determines if any other HO pre-notification confirm message is received from the serving BS. If the any other HO pre-notification confirm message is received, the neighbor BS returns to step 411 and repeatedly performs subsequent steps. If the ranging request message is received, in step 421, the neighbor BS transmits a ranging response message to the MS.

At this time, as illustrated, if a target BS again receives a HO pre-notification confirm message for the same MS from a serving BS, the target BS transmits a fast ranging IE not only at an existing estimated HO time but also at an estimated HO time specified in the again received HO pre-notification confirm message. If a ranging request message is received from the MS prior to the again received estimated HO time, the target BS cancels retransmission of the fast ranging IE and performs an existing HO process.

Then, the neighbor BS terminates the process according to an exemplary embodiment of the present invention.

Configurations of a serving BS and neighbor BS according to an exemplary embodiment of the present invention are described below. The serving BS and neighbor BS with the same interface module (i.e., communication module) have the same construction and thus, an operation of one of the serving BS and neighbor BS is described below.

Figure 5:
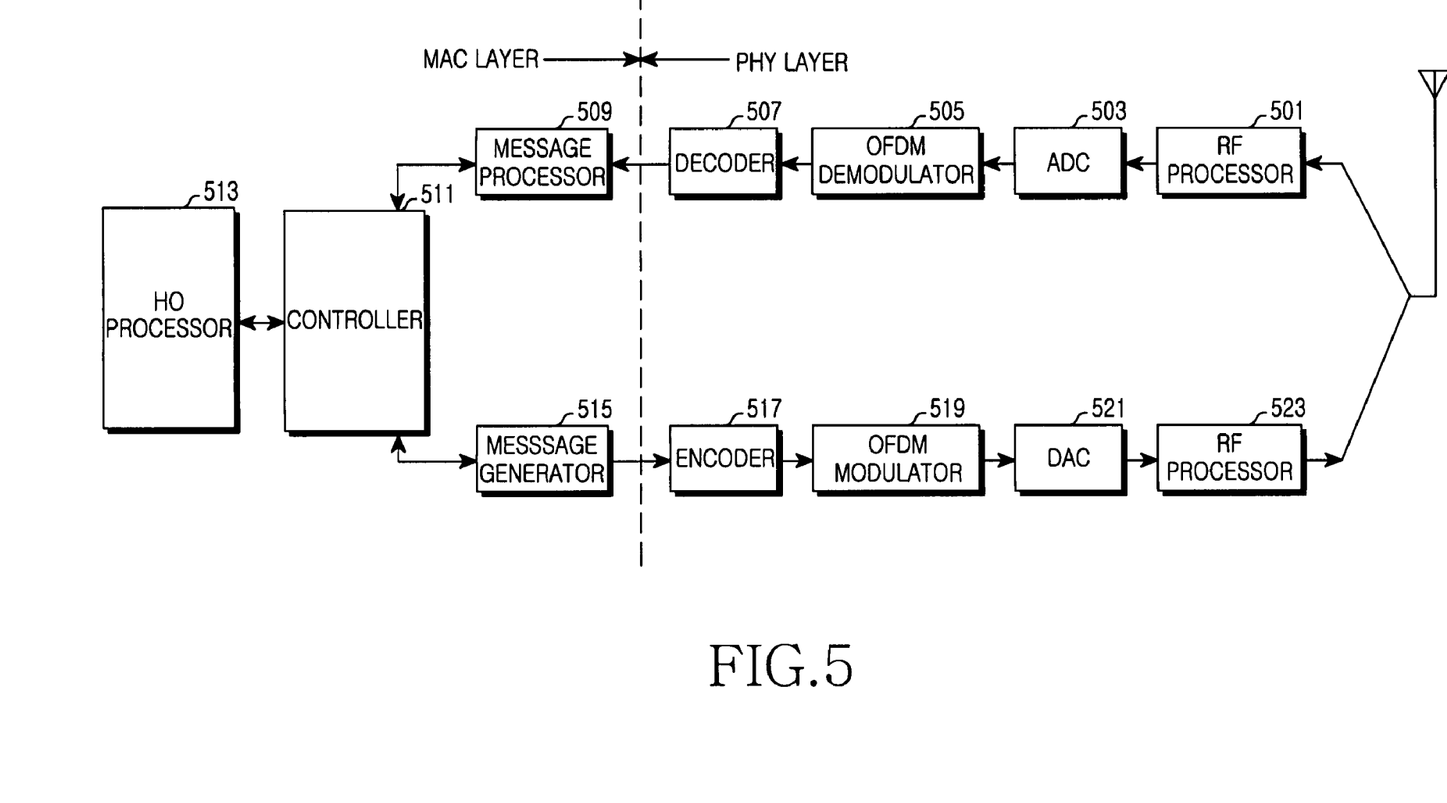
FIG. 5 is a block diagram illustrating a construction of a serving BS or a target BS according to an exemplary embodiment of the present invention.

FIG. 5 is a block diagram illustrating a configuration of a serving BS or a target BS according to an exemplary embodiment of the present invention.

As illustrated in FIG. 5, the serving BS (or neighbor BS) according to an exemplary embodiment of the present invention includes a Radio Frequency (RF) processor 501, an Analog to Digital Converter (ADC) 503, an Orthogonal Frequency Division Multiplexing (OFDM) demodulator 505, a decoder 507, a message processor 509, a controller 511, a HO processor 513, a message generator 515, an encoder 517, an OFDM modulator 519, a Digital to Analog Converter (DAC) 521, and an RF processor 523.

Referring to FIG. 5, the RF processor 501 converts an RF signal received through an antenna into a baseband analog signal. The ADC 503 converts the analog signal from the RF processor 501 into sample data. The OFDM demodulator 505 processes, by Fast Fourier Transform (FFT) operation, the sample data output from the ADC 503 and outputs frequency domain data. The decoder 507 selects data of subcarriers actually intended for reception among the frequency domain data from the OFDM demodulator 505, and demodulates and decodes the selected data according to a predefined modulation level (i.e., a Modulation and Coding Scheme (MCS) level).

The message processor 509 analyzes a control message input from the decoder 507 and provides the result to the controller 511. According to an exemplary embodiment of the present invention, the message processor 509 extracts a variety of kinds of control information from a HO related control message received and provides the extracted control information to the controller 511.

The controller 511 performs a corresponding process for information from the message processor 509 and provides the result to the message generator 515. Particularly, the controller 511 of the serving BS or neighbor BS updates an estimated HO time of an MS in a process of HO message exchange between BSs considering transmission delay of a backbone network, transmission delay of a wireless network, and transmission delay caused by a wireless network packet loss. Also, the controller 511 of the target BS transmits a fast ranging IE to the MS at a finally updated estimated HO time of the MS. Such a method solves a problem that, because a pre-HO delay exceeds the estimated HO time, the MS fails to receive the fast ranging IE transmitted by the target BS.

The HO processor 513 performs a function of generating and managing information necessary for HO under control of the controller 511. For example, in the case of the serving BS, the information necessary for HO can be information on a wireless network transmission delay time, a backbone network delay time, a residual estimated HO time, an estimated HO action time, a resource retain time, and so forth. In the case of the neighbor BS, the information necessary for HO can be information on a residual estimated HO time.

The message generator 515 generates a message with a variety of kinds of information received from the controller 511 and outputs the generated message to the encoder 517 of a physical layer. According to an exemplary embodiment of the present invention, the message generator 515 generates a HO related control message to be transmitted and outputs the generated control message to the encoder 517.

The encoder 517 encodes and modulates data from the message generator 515 according to a predefined modulation level (i.e., an MCS level). The OFDM modulator 519 processes, by Inverse Fast Fourier Transform (IFFT) operation, the data from the encoder 517 and outputs sample data (i.e., an OFDM symbol). The DAC 521 converts the sample data into an analog signal. The RF processor 523 converts the analog signal from the DAC 521 into an RF signal and transmits the RF signal through the antenna.

As described above, exemplary embodiments of the present invention have an advantage of, by allowing a serving BS and a target BS to negotiate an estimated HO time of an MS while the MS performs HO, allowing the MS to stably receive a fast ranging IE and reducing a HO interruption time in a broadband wireless communication system. The reduction of the HO interruption time provides an advantage of not only being able to improve a QoS of a corresponding MS but also reducing an unnecessary wireless HO message exchange, thus enabling efficient use of a wireless resource.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for supporting a Handover (HO) of a Mobile Station (MS) served by a serving Base Station (BS), the method comprising:
   receiving a HO pre-notification response message comprising a residual estimated HO time from a target BS;
   determining a current residual estimated HO time using the residual estimated HO time; and
   exchanging the determined residual estimated HO time with the target BS,
   wherein the current residual estimated HO time is determined based on a first time at which the HO pre-notification response message is received and a second time at which the HO pre-notification response message is generated.

2. The method of claim 1, wherein the residual estimated HO time comprised in the HO pre-notification response message is a time determined using an estimated HO time comprised in a HO pre-notification message that the target BS receives from the serving BS.

3. The method of claim 1, further comprising:
   transmitting a packet to the MS, receiving a response to the packet from the MS, and determining a wireless network transmission delay time;
   determining a backbone network delay time using the residual estimated HO time comprised in the HO pre-notification response message; and
   updating the residual estimated HO time using the determined wireless network transmission delay time, backbone network delay time, and current residual estimated HO time,
   wherein the residual estimated HO time exchanged with the target BS is equal to the updated residual estimated HO time.

4. The method of claim 3, wherein the wireless network transmission delay time is determined using the following equation:

$$T_{RTT} \leftarrow \alpha T_{RTT} + (1-\alpha)(T_{ACK} - T_{Data})$$

where,
TRTT: wireless network transmission delay time;
TData: time for transmitting packet to the MS;
TACK: time for receiving response to the packet; and
$\alpha$: weight within a range of $0 \leq \alpha \leq 1$,
wherein the wireless network transmission delay time (TRTT) is determined by applying a suitable weight to a previous TRTT and current wireless network transmission delay conditions.

5. The method of claim 3, wherein the backbone network delay time is determined using a difference between the estimated HO time that the serving BS transmits to the target BS through the HO pre-notification message and the residual estimated HO time comprised in the HO pre-notification response message.

6. The method of claim 3, wherein the residual estimated HO time is updated using the following equation:

$$T_{Residual,S} = \text{Max}\{T_{RTT} + T_{Sync} + T_{Margin}, T_{BD}, T_{Residential,S}\}$$

$$T_{Residual,S} = \text{Max}\{T_{RTT} + T_{sync} + T_{Margin}, T_{BD}, T_{Residential,S}\} \quad (9)$$

where,
TRTT: wireless network transmission delay time;
TSync: time for synchronization between the MS and the target BS;
TMargin: time for acquiring, by the MS, a fast ranging IE from the target BS after synchronization;
TBD: backbone network delay time; and
TResidual, S: current residual estimated HO time.

7. The method of claim 3, further comprising:
operating a timer that is set on the basis of the determined wireless network transmission delay time;
when a HO indication message is received from the MS prior to the timer expires, releasing a connection setup with the MS; and
when a HO indication message is not received from the MS until the timer expires, again determining the wireless network transmission delay time.

8. The method of claim 1, further comprising:
determining at least one of an estimated HO action time of the MS and a resource retain time using the determined residual estimated HO time; and
transmitting a HO response message comprising at least one of the determined estimated HO action time and resource retain time to the MS.

9. The method of claim 8, wherein the estimated HO action time and resource retain time are determined using the following equation:

$$\text{Action\_time} = \left\lceil \frac{T_{Residual,S}}{T_{frame}} \right\rceil$$

$$\text{Resource\_retain\_time} = \left\lceil \frac{T_{Residual,S} - T_{sync} - T_{Margin}}{T_{frame}} \right\rceil$$

where,
TResidual, S: determined residual estimated HO time;
Tframe: frame period;
TSync: time for synchronization between the MS and the target BS; and
TMargin: time for acquiring, by the MS, a fast ranging IE from the target BS after synchronization.

10. A method for supporting a Handover (HO) of a Mobile Station (MS) served by a target Base Station (BS), the method comprising:
receiving a HO pre-notification message comprising an estimated HO time from a serving BS of the MS;
determining a residual estimated HO time using the estimated HO time; and
transmitting a HO pre-notification response message comprising the determined residual estimated HO time to the serving BS,
wherein the current residual estimated HO time is determined based on a first time at which the HO pre-notification response message is received and a second time at which the HO pre-notification response message is generated.

11. The method of claim 10, further comprising:
receiving a HO pre-notification confirm message comprising the residual estimated HO time determined by the serving BS, from the serving BS;
updating its own determined residual estimated HO time by the residual estimated HO time determined by the serving BS; and
transmitting a fast ranging Information Element (IE) to the MS after the updated residual estimated HO time.

12. An apparatus for supporting a Handover (HO) of a Mobile Station (MS) served by a serving Base Station (BS), the apparatus comprising:
a receiver configured to receive a HO pre-notification response message comprising a residual estimated HO time from a target BS;
a HO processor configured to determine a current residual estimated HO time using the residual estimated HO time; and
a transmitter configured to exchange the determined current residual estimated HO time with the target BS,
wherein the current residual estimated HO time is determined based on a first time at which the HO pre-notification response message is received and a second time at which the HO pre-notification response message is generated.

13. The apparatus of claim 12, wherein the residual estimated HO time comprised in the HO pre-notification response message comprises a time determined using an estimated HO time comprised in a HO pre-notification message that the target BS receives from the serving BS.

14. The apparatus of claim 12, wherein the transmitter is configured to transmit a packet to the MS,
the receiver is configured to receive a response to the packet from the MS, and
the HO processor is configured to determine a wireless network transmission delay time using a packet transmitted to the MS and a response to the packet received from the MS, determine a backbone network delay time using the residual estimated HO time comprised in the HO pre-notification response message, and update the residual estimated HO time using the determined wireless network transmission delay time, backbone network delay time, and current residual estimated HO time, and
wherein the residual estimated HO time exchanged with the target BS is equal to the updated residual estimated HO time.

15. The apparatus of claim 14, wherein the wireless network transmission delay time is determined using the following equation:

$$T_{RTT} \leftarrow \alpha T_{RTT} + (1-\alpha)(T_{ACK} - T_{Data}) \quad (13)$$

where,
TRTT: wireless network transmission delay time;
TData: time for transmitting packet to the MS;
TACK: time for receiving response to the packet; and
α: weight within a range of $0 \leq \alpha \leq 1$, and
wherein the wireless network transmission delay time (TRTT) is determined by applying a suitable weight to a previous TRTT and current wireless network transmission delay conditions.

16. The apparatus of claim 14, wherein the backbone network delay time is determined using a difference between the estimated HO time that the serving BS transmits to the target BS through the HO pre-notification message and the residual estimated HO time comprised in the HO pre-notification response message.

17. The apparatus of claim 14, wherein the residual estimated HO time is updated using the following equation:

$$T_{Residual,S} = \text{Max}\{T_{RTT}+T_{Sync}+T_{Margin}, T_{BD}, T_{Residential,S}\}$$

where,
TRTT: wireless network transmission delay time;
TSync: time for synchronization between the MS and the target BS;
TMargin: time for acquiring, by the MS, a fast ranging IE from the target BS after synchronization;
TBD: backbone network delay time; and
TResidual, S: current residual estimated HO time.

18. The apparatus of claim 14, wherein the HO processor is configured to operate a timer that is set on the basis of the determined wireless network transmission delay time, release a connection setup with the MS when a HO indication message is received from the MS prior to the timer expires, and again determine the wireless network transmission delay time when a HO indication message is not received from the MS until the timer expires.

19. The apparatus of claim 12, wherein the HO processor is configured to determine at least one of an estimated HO action time of the MS and a resource retain time using the determined residual estimated HO time, and
wherein the transmitter is configured to transmit a HO response message comprising at least one of the determined estimated HO action time and resource retain time to the MS.

20. The apparatus of claim 19, wherein the estimated HO action time and resource retain time are determined using the following equation:

$$\text{Action\_time} = \left\lceil \frac{T_{Residual,S}}{T_{frame}} \right\rceil$$

$$\text{Resource\_retain\_time} = \left\lceil \frac{T_{Residual,S} - T_{sync} - T_{Margin}}{T_{frame}} \right\rceil$$

where,
TResidual, S: determined residual estimated HO time;
Tframe: frame period;
TSync: time for synchronization between the MS and the target BS; and
TMargin: time for acquiring, by the MS, a fast ranging IE from the target BS after synchronization.

21. An apparatus for supporting a Handover (HO) of a Mobile Station (MS) served by a target Base Station (BS), the apparatus comprising:
a receiver configured to receive a HO pre-notification message comprising an estimated HO time from a serving BS of the MS;
a HO processor configured to determine a residual estimated HO time using the estimated HO time; and
a transmitter configured to transmit a HO pre-notification response message comprising the determined residual estimated HO time to the serving BS,
wherein the current residual estimated HO time is determined based on a first time at which the HO pre-notification response message is received and a second time at which the HO pre-notification response message is generated.

22. The apparatus of claim 21, wherein the receiver is configured to receive a HO pre-notification confirm message comprising the residual estimated HO time determined by the serving BS, from the serving BS,
the HO processor is configured to update its own determined residual estimated HO time by the residual estimated HO time determined by the serving BS, and
the transmitter is configured to transmit a fast ranging Information Element to the MS after the updated residual estimated HO time.

* * * * *